(12) United States Patent
Biskeborn

(10) Patent No.: US 8,773,795 B1
(45) Date of Patent: Jul. 8, 2014

(54) PRODUCTS WITH TAPE FORMATS HAVING ONE OR MORE SPARE AREAS AND APPARATUSES CONFIGURED FOR USE WITH SUCH PRODUCTS

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/923,280

(22) Filed: Jun. 20, 2013

(51) Int. Cl.
*G11B 5/09* (2006.01)

(52) U.S. Cl.
USPC ................................. 360/48; 360/75

(58) Field of Classification Search
None
See application file for complete search history.

(56) References Cited

U.S. PATENT DOCUMENTS

| | | | |
|---|---|---|---|
| 5,862,014 A | 1/1999 | Nute | |
| 6,469,867 B2 | 10/2002 | Saliba | |
| 6,918,554 B2 * | 7/2005 | Stamm et al. | 242/338 |
| 7,570,450 B2 | 8/2009 | Koeppe | |
| 8,233,246 B2 | 7/2012 | Koeppe | |
| 8,254,058 B2 | 8/2012 | Biskeborn | |
| 2009/0150599 A1 | 6/2009 | Bennett | |
| 2009/0213493 A1 * | 8/2009 | Bui et al. | 360/110 |
| 2009/0231756 A1 | 9/2009 | Koeppe | |
| 2011/0102943 A1 * | 5/2011 | Biskeborn et al. | 360/132 |
| 2011/0199703 A1 | 8/2011 | Hansen et al. | |
| 2012/0236433 A1 | 9/2012 | Koeppe | |
| 2012/0307399 A1 | 12/2012 | Hoerger et al. | |

OTHER PUBLICATIONS

Catherine Degraaf, "Tape DriveTechnology Comparison," Spectra Logic Corporation, Nov. 2001, pp. 1-34.
J H Wilkinson, "The Serial Digital Data Interface (SDDI)," International Broadcasting Convention, Sep. 1996, pp. 425-430.

* cited by examiner

*Primary Examiner* — Paul Huber
(74) *Attorney, Agent, or Firm* — Zilka-Kotab, PC

(57) ABSTRACT

An apparatus includes a magnetic head having an array of transducers. The apparatus is configured to read and/or write to a magnetic recording tape according to a format. The format specifies a number of active channels, locations of data tracks on the magnetic recording tape, and a contiguous spare area on the magnetic recording tape. The format also specifies backward compatibility with a second format. The second format specifies a smaller number of active channels than the number of active channels specified by the format. A product includes a magnetic recording tape and a cartridge memory. The cartridge memory has data stored therein specifying the aforementioned format.

20 Claims, 12 Drawing Sheets

PRODUCTS WITH TAPE FORMATS HAVING ONE OR MORE SPARE AREAS AND APPARATUSES CONFIGURED FOR USE WITH SUCH PRODUCTS

BACKGROUND

The present invention relates to data storage systems, and more particularly, this invention relates to products and apparatuses having and/or compatible with a tape format having a contiguous spare area.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

A continuing goal in tape drive systems is effectively managing placement of tracks on tape. In particular, track density is nearly doubling every generation to achieve an approximately 40% per year growth in cartridge capacity within each product family. Another goal is to manage head and electronics designs as channels are added to allow data rate to keep pace with the growing number of data tracks. For example, ongoing goals include using fewer, more integrated ASICs, a least possible number of head channels, and elimination of multiplexing.

BRIEF SUMMARY

An apparatus according to one embodiment includes a magnetic head having an array of transducers. The apparatus is configured to read and/or write to a magnetic recording tape according to a format. The format specifies a number of active channels, locations of data tracks on the magnetic recording tape, and a contiguous spare area on the magnetic recording tape. The format also specifies backward compatibility with a second format. The second format specifies a smaller number of active channels than the number of active channels specified by the format.

An apparatus according to another embodiment includes a magnetic head having an array of transducers including data and servo transducers. The apparatus is configured to read and/or write to a magnetic recording tape according to a format. The format specifies a number of active channels symmetrically arranged about a center of the array, locations of data tracks on the magnetic recording tape, and spare areas on the magnetic recording tape. The format also specifies backward compatibility with a second format. The second format specifies a smaller number of active channels than the number of active channels specified by the format.

A product according to one embodiment includes a magnetic recording tape and a cartridge memory. The cartridge memory has data stored therein specifying a format. The format specifies a number of active channels, locations of data tracks on the magnetic recording tape, and a contiguous spare area on the magnetic recording tape. The format also specifies backward compatibility with a second format. The second format specifies a smaller number of active channels than the number of active channels specified by the format.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Also described, according to some embodiments, is a contiguous spare area tape format for use with a drive having backward compatibility, where the legacy format has a smaller number of simultaneously-written data tracks than the newer format.

In one general embodiment, an apparatus includes a magnetic head having an array of transducers. The apparatus is configured to read and/or write to a magnetic recording tape according to a format. The format specifies a number of active channels, locations of data tracks on the magnetic recording tape, and a contiguous spare area on the magnetic recording tape. The format also specifies backward compatibility with a second format. The second format specifies a smaller number of active channels than the number of active channels specified by the format.

In another general embodiment, an apparatus includes a magnetic head having an array of transducers including data and servo transducers. The apparatus is configured to read and/or write to a magnetic recording tape according to a format. The format specifies a number of active channels symmetrically arranged about a center of the array, locations of data tracks on the magnetic recording tape, and spare areas on the magnetic recording tape. The format also specifies backward compatibility with a second format. The second format specifies a smaller number of active channels than the number of active channels specified by the format.

In yet another general embodiment, a product includes a magnetic recording tape and a cartridge memory. The cartridge memory has data stored therein specifying a format. The format specifies a number of active channels, locations of data tracks on the magnetic recording tape, and a contiguous spare area on the magnetic recording tape. The format also specifies backward compatibility with a second format. The second format specifies a smaller number of active channels than the number of active channels specified by the format.

Figure 1A:
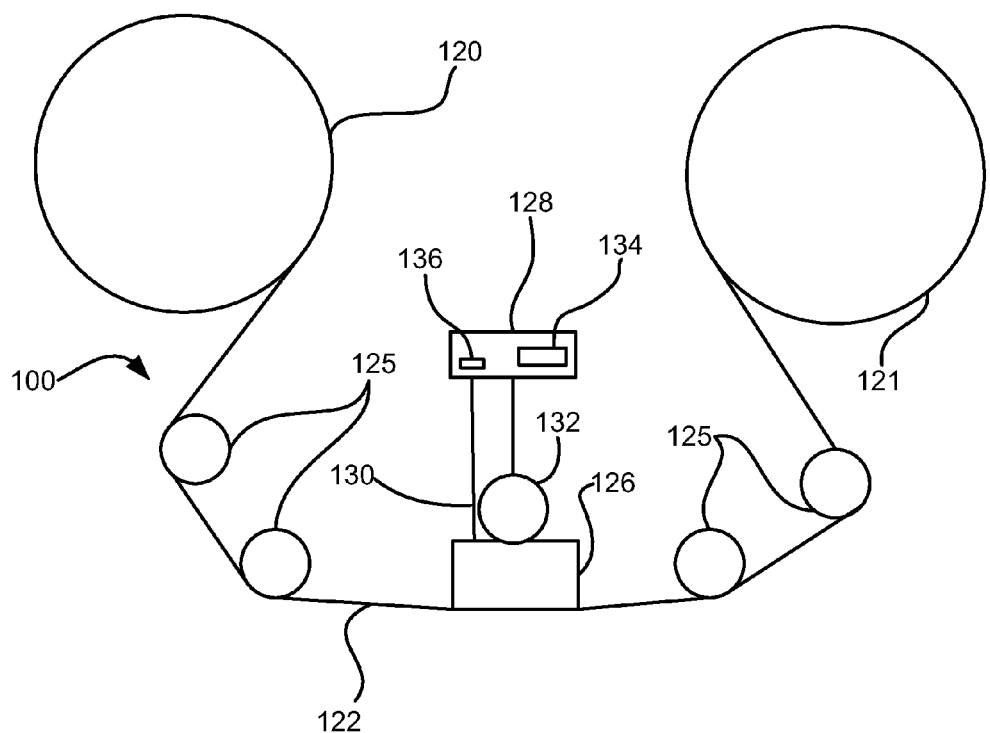
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
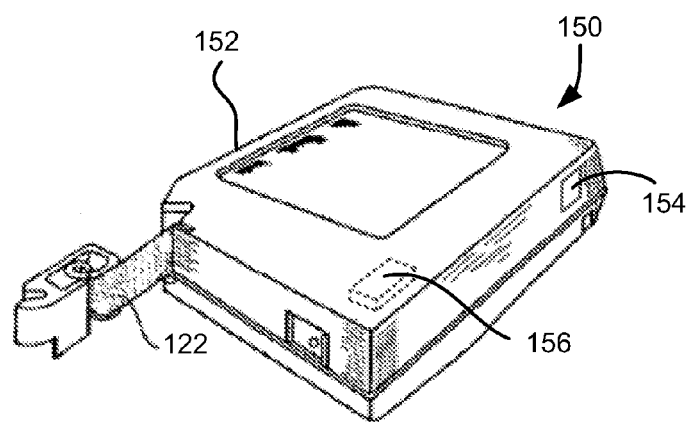
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
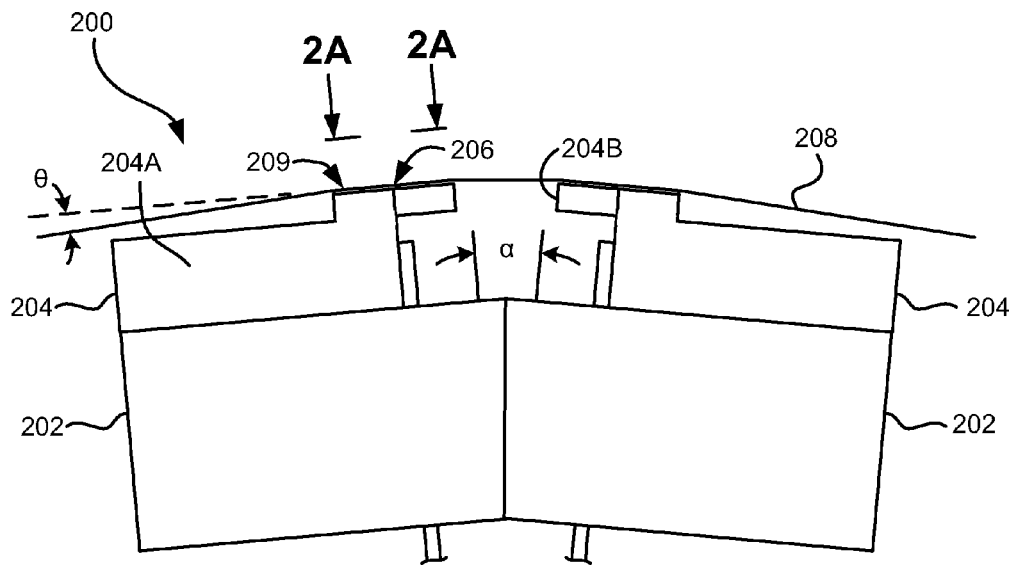
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged").! The readers and writers may also be arranged in an interleaved configuration. Alternatively, each array of channels may be readers or writers only. Any of these arrays may contain one or more servo track readers for reading servo data on the medium.

Figure 2A:
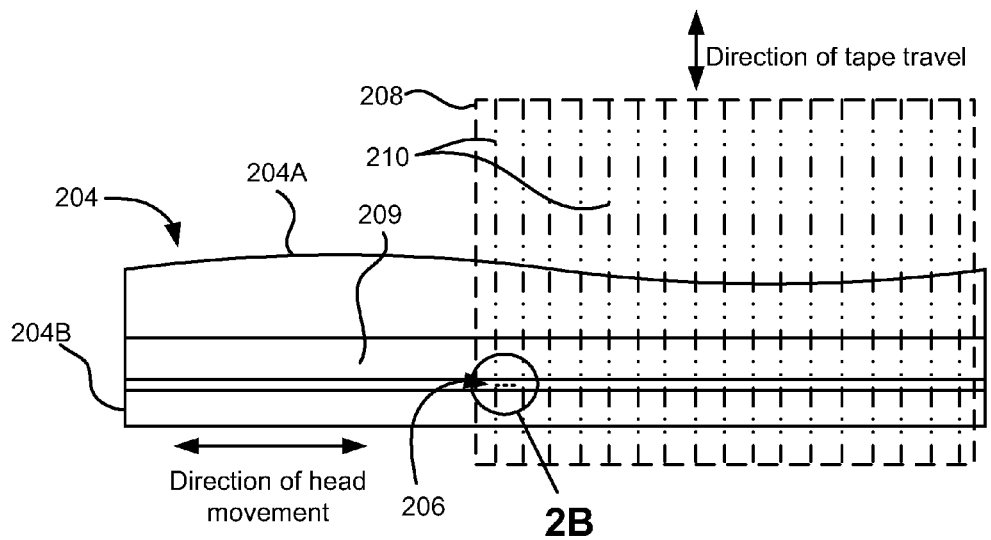
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
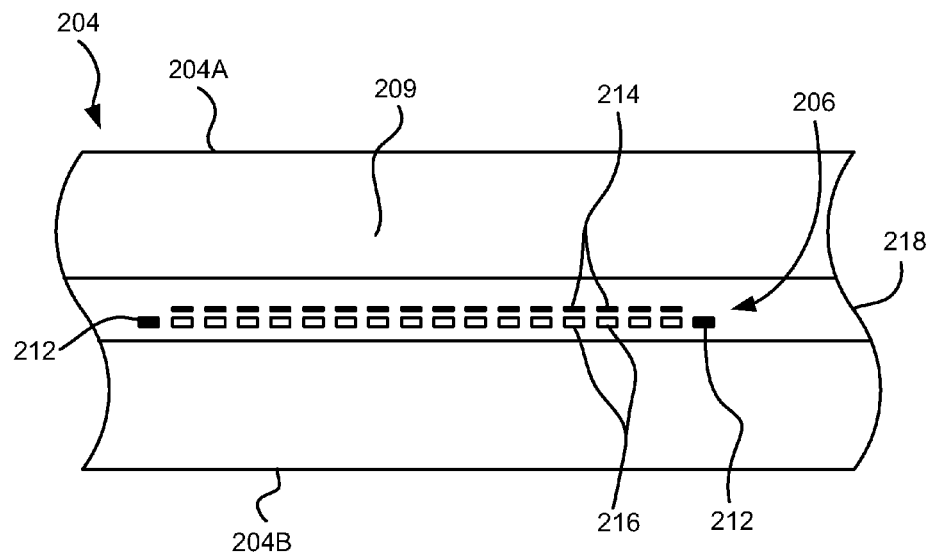
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader and/or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
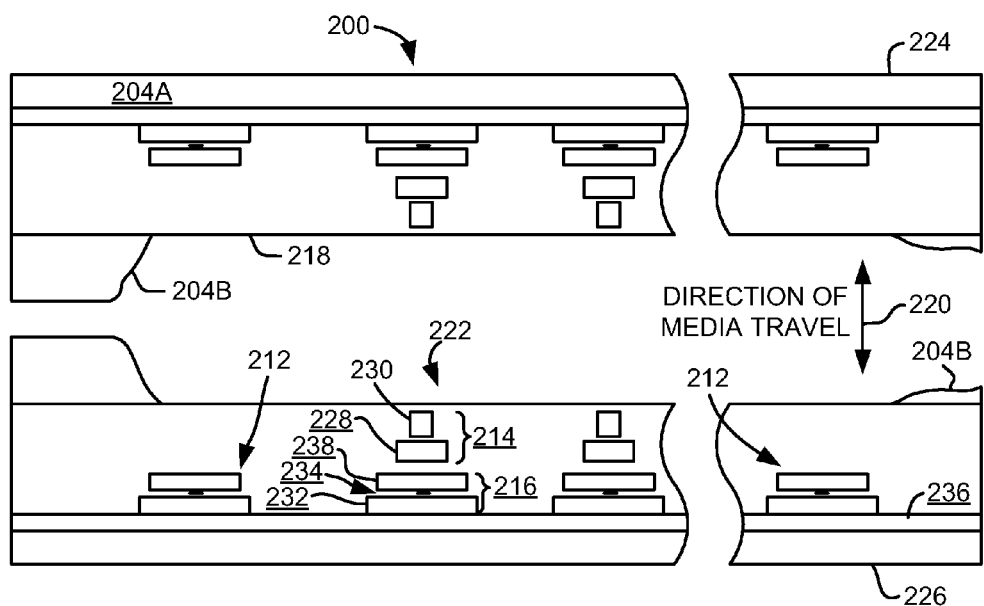
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
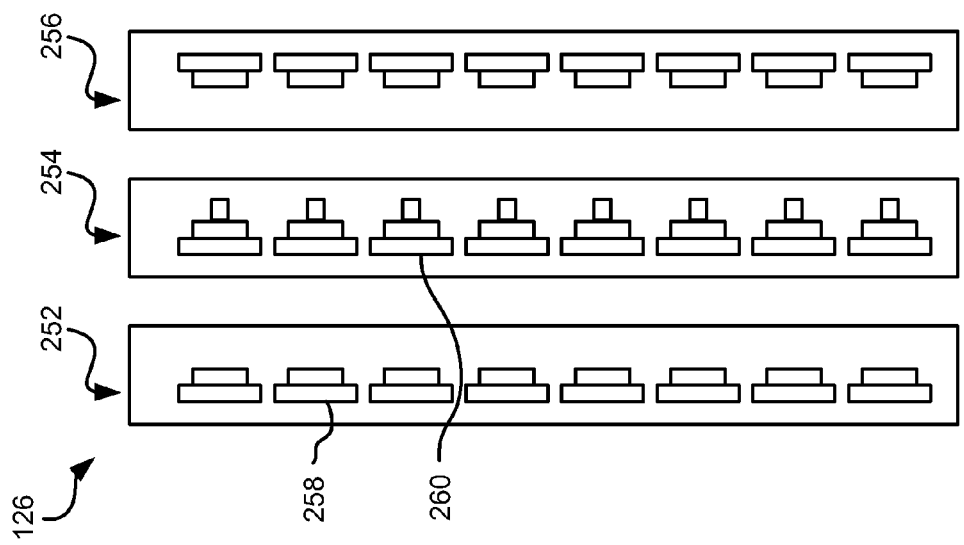
FIG. 4 is a partial tape bearing surface view of a magnetic head having a read-write-read configuration.
Figure 3:
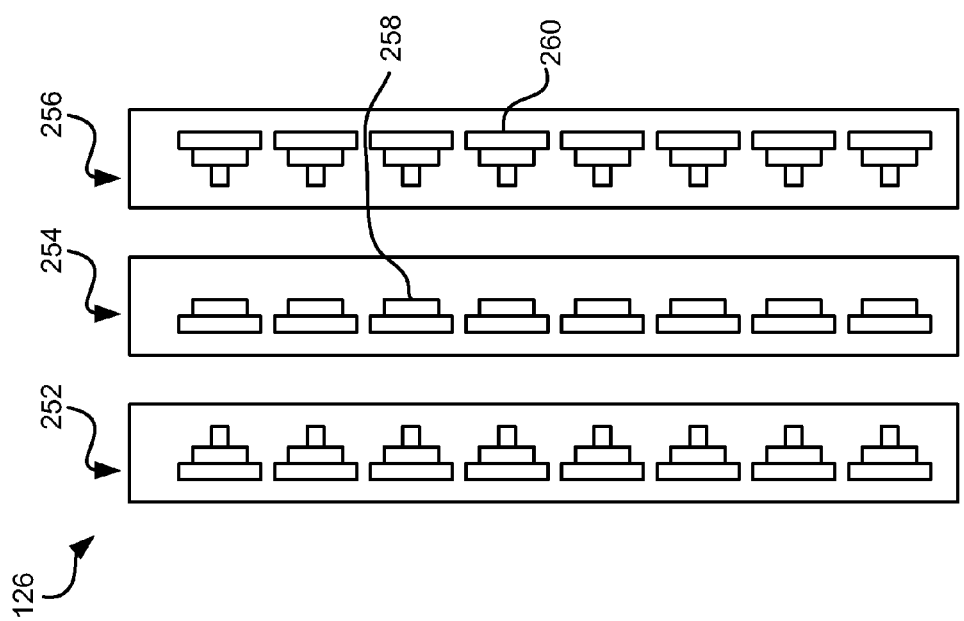
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
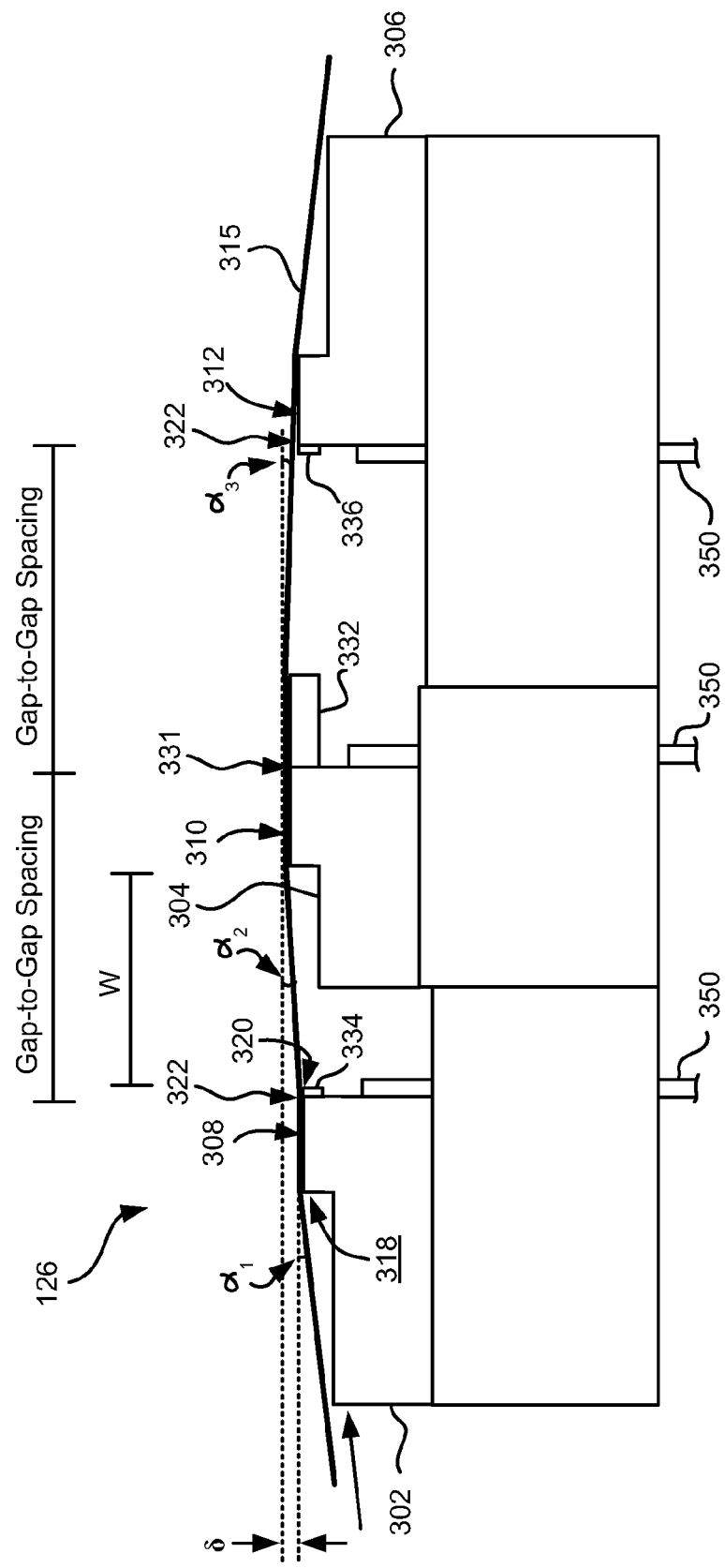
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
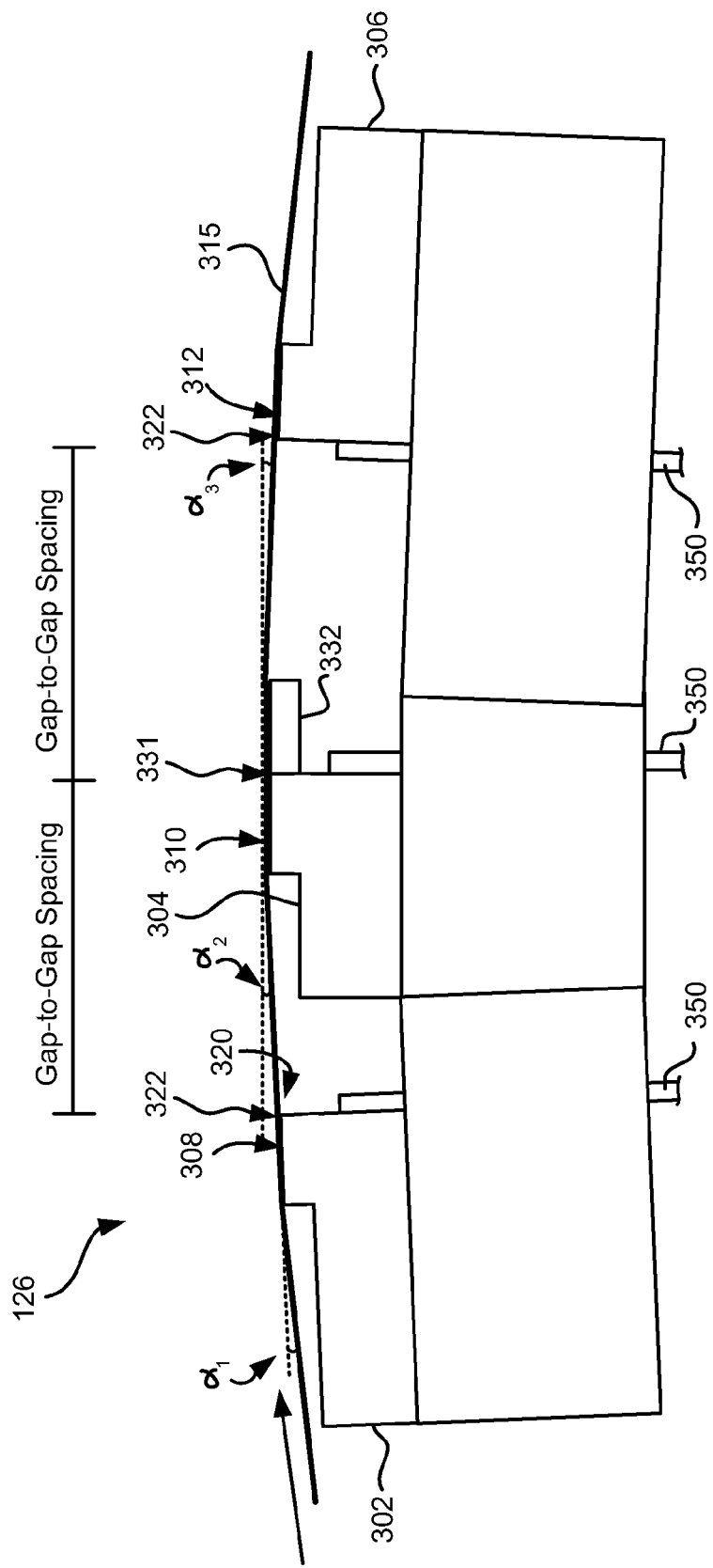
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap $angle_2$ of the second module 304. In other words, the planes of the tape bearing surfaces 308, 312 of the outer modules 302, 306 are oriented at about the desired wrap $angle_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
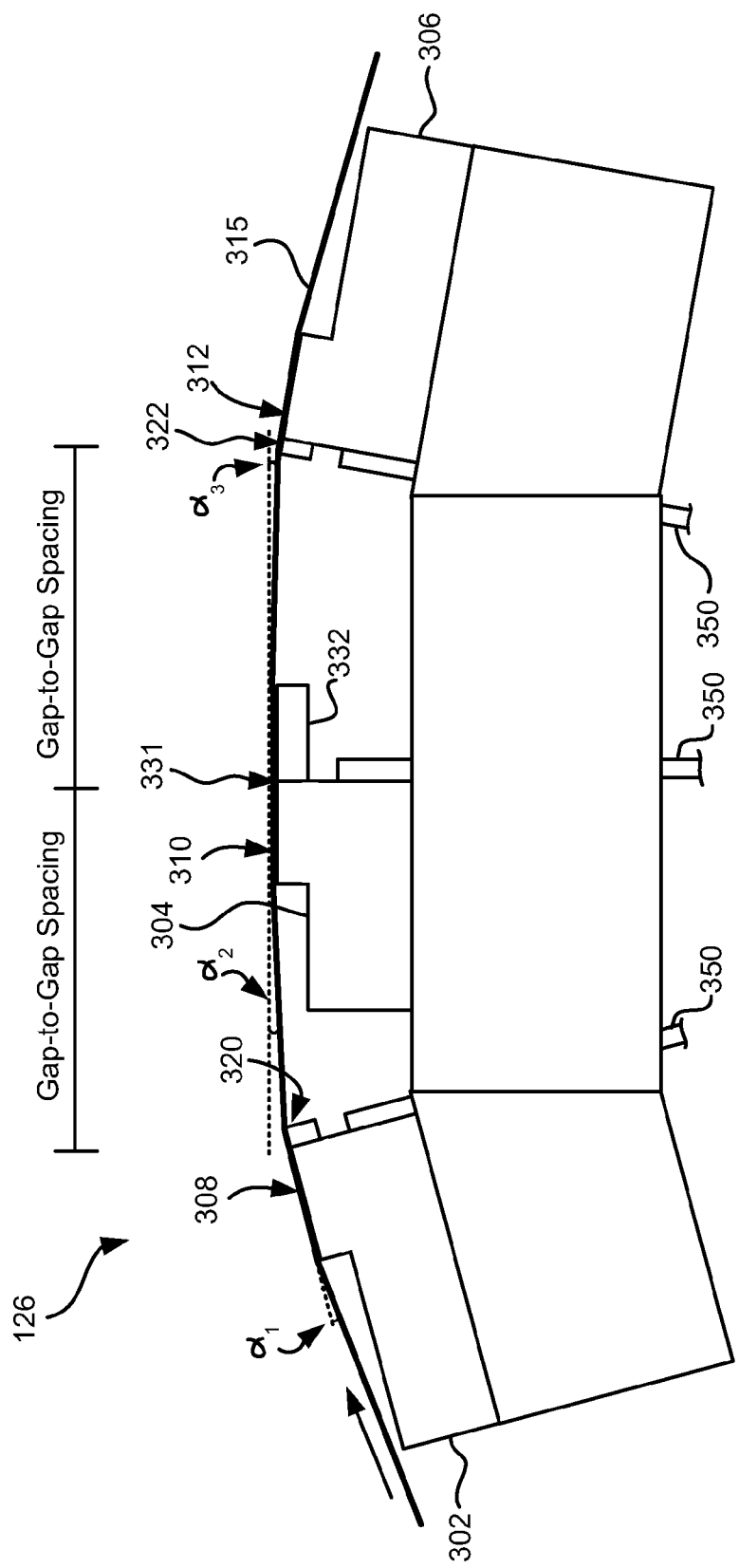
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap $angle_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As alluded to above, various embodiments are associated with a format for magnetic tape recording products and systems. Such format addresses the need for a configuration that enables higher data rate by allowing more active transducer channels in use per wrap, but at the same time provides backward compatibility to at least a previous generation having fewer active transducer channels in use per wrap.

Consider, for example, Linear Tape Open, $3^{rd}$ generation (LTO-3), which is a 16 channel format that is backward compatible to LTO-2, which is an 8 channel format. LTO was created at the outset to accommodate both 8 and 16 channel formats, and thus enable a transition from 8 to 16 channels. Continuing with this example, transitioning from LTO-3 to 32 channels and keeping backward compatibility means the pitch between channels needs to be halved again. This creates an asymmetry in the format, resulting in creation of spare area in a given data band.

"Spare area" may be defined, in some approaches, as area that is nonattainable for user data in the format being used, and is not a guard band positioned adjacent the servo tracks.

In various embodiments, the spare area created by doubling the number of channels in, for example, an LTO format is contiguous. In one approach, the spare area that is created is contiguous when, for example, the number of channels is doubled in a format wherein the number of active channels is modulo 4, 8, 16, etc. A contiguous spare area is one where all the area not written to when a data band is fully written occupies one area of the tape, e.g., as a stripe along the length of the tape. This does not include guard bands adjacent the servo tracks. The contiguous spare area may be centered in the format, may be placed proximate to servo tracks, or at any point therebetween.

Thus, in one embodiment, the format specifies a data structure on the magnetic recording tape, such as a number of active data channels used to read and/or write to the tape, general locations of data tracks on the magnetic recording tape, and a spare area on the magnetic recording tape, where the spare area may be contiguous. The format also specifies backward compatibility with a second format (e.g., a legacy format). In one approach, the second format specifies a smaller number of active channels than the number of active channels specified by the aforementioned format. The number of active channels specified in the first and/or second format may be modulo an even number, where "modulo" means "a multiple of." The second format in various approaches may specify no spare area, a split spare area, or a contiguous spare area.

Figure 8:
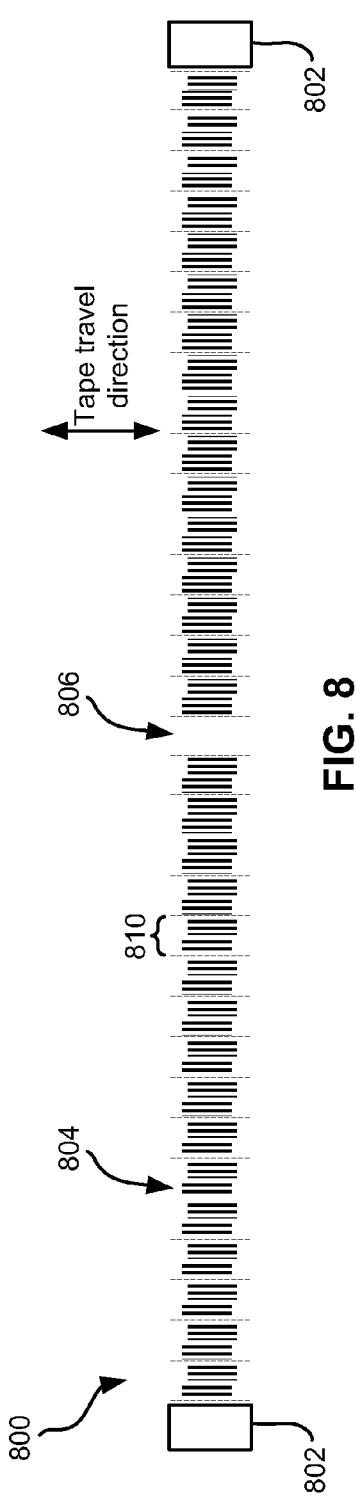
FIG. 8 is a partial representational view of a data band of a magnetic recording tape having a contiguous spare area positioned centrally, according to one embodiment.

FIG. 8 depicts a partial view of a preferred embodiment of a product 800 in the form of a magnetic recording tape, in accordance with one embodiment. As an option, the present product 800 may be implemented in conjunction with features from any other embodiment listed herein, such as those described with reference to the other FIGS. For example, the product 800 may be embodied as a cartridge, such as that shown in FIG. 1A, and having a cartridge memory with data therein specifying the format. Of course, however, such product 800 and others presented herein may be used in various applications and/or in permutations which may or may not be specifically described in the illustrative embodiments listed herein. Further, the product 800 presented herein may be used in any desired environment.

Referring to FIG. 8, there is shown a single data band and servo tracks 802 sandwiching the data band. The format preferably specifies modulo an even number, e.g., 2, 4, 8, 16, 32, 64, etc., of active channels and the example shown specifies a 32 channel reading and/or writing of data tracks 804, and formation of a contiguous spare area 806 that is centered relative to the data tracks, and correspondingly, centered relative to the array of transducers that read and/or write the data tracks according to the format, in a direction perpendicular to the tape travel direction. See, e.g., the arrays in FIG. 9.

Figure 9:
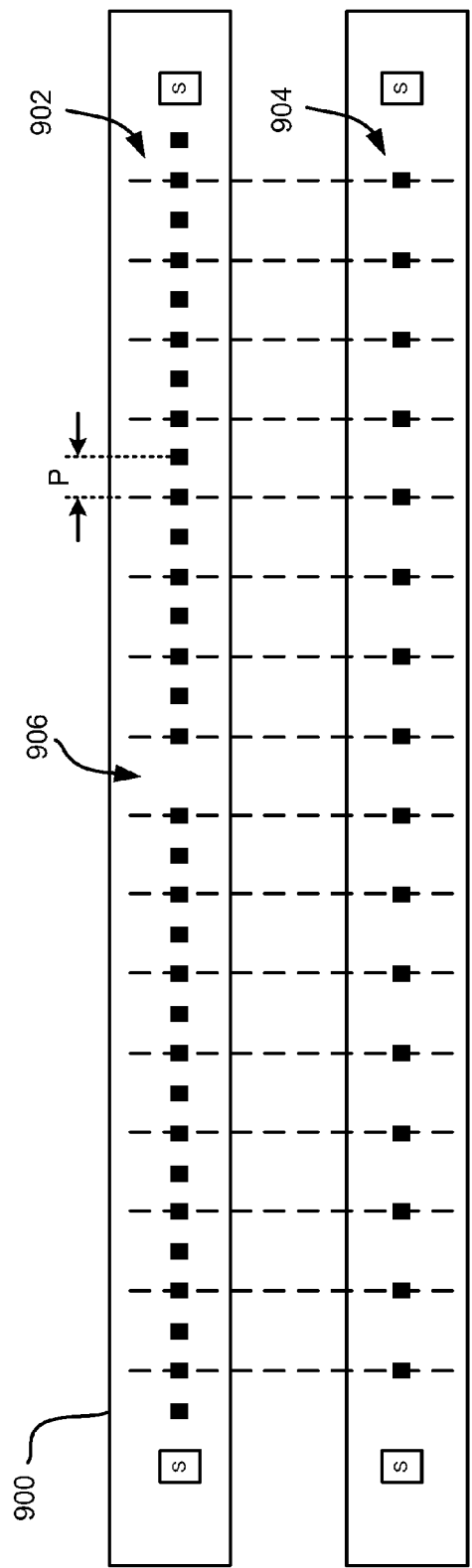
FIG. 9 is a partial representational view of an array of transducers positioned according to a format, according to one embodiment, and an array of transducers positioned according to a second format.

FIG. 9 depicts a representational view of a preferred embodiment of an apparatus 900 in the form of an array of transducers of a magnetic head, not to scale, configured to read and/or write to a magnetic recording tape according to a format, in accordance with one embodiment. As an option, the present apparatus 900 may be implemented in conjunction with features from any other embodiment listed herein, such as those described with reference to the other FIGS. Of course, however, such apparatus 900 and others presented herein may be used in various applications and/or in permutations which may or may not be specifically described in the illustrative embodiments listed herein. Further, the apparatus 900 presented herein may be used in any desired environment.

Referring to FIG. 9, there is shown an array 902 of transducers positioned according to the format, which in this example specifies 32 channel reading and writing. Servo readers S are also shown flanking the array 902. When the array 902 is viewed in conjunction with the data band of FIG. 8, it is seen that the spare area 806 is centered relative to the array of transducers. For simplicity, the term "spare area" may be used herein to also describe area on the magnetic head that corresponds to the spare area on the magnetic recording tape. Thus, the array is logically divided into two symmetrical subarrays oriented about the spare area position and/or center point of the array. This symmetry has the advantage that the resultant format is symmetrical, which not only facilitates using the spare area for other functions if desired, but also greatly simplifies fabrication of the apparatus used for recording data in this format, and deployment of that apparatus in a manner that obviates a need for transducer multiplexing, etc.

As alluded to above, the array 902 may have an inactive region 906 corresponding to the spare area, and positioned between the symmetrical subarrays. For example, the array may not have a middle transducer in the inactive region 906. Alternatively, a middle transducer may be present, but is inactive, e.g., not coupled to a cable, damaged, or simply not activated during operation of the apparatus. The width of the inactive region, may be approximately 2× the center to center transducer pitch P in one of the subarrays. However, the resulting spare area on the tape has a width about equal to a sub-data band 810 (e.g., adjacent tracks written by a single transducer or otherwise corresponding to the lateral range of one transducer position in the array). The sub-data band 810 itself, when fully written, may be about equal to the center to center transducer pitch P.

In order to provide the backward compatibility with a second format, having a smaller number of active channels than the first array 902, and where the smaller number is modulo an even number, various transducers of the array 902 are generally positioned as specified in the second format as well. To exemplify, also shown in FIG. 9 is an array 904 of transducers, not to scale, at positions specified by the second format. In one approach, if the second format specified N channels, the array according to the format may have 2×N or 2×N+1 transducers.

In one embodiment, the apparatus 900 is configured to read and/or write to a magnetic recording tape according to the second (e.g., legacy) format, where no contiguous spare area is created when a data band is fully written in the second format. The apparatus is also configured to read and/or write to a magnetic recording tape according to the (e.g., newer) format, where the contiguous spare area is created when a data band is fully written in the format.

Figure 10A:
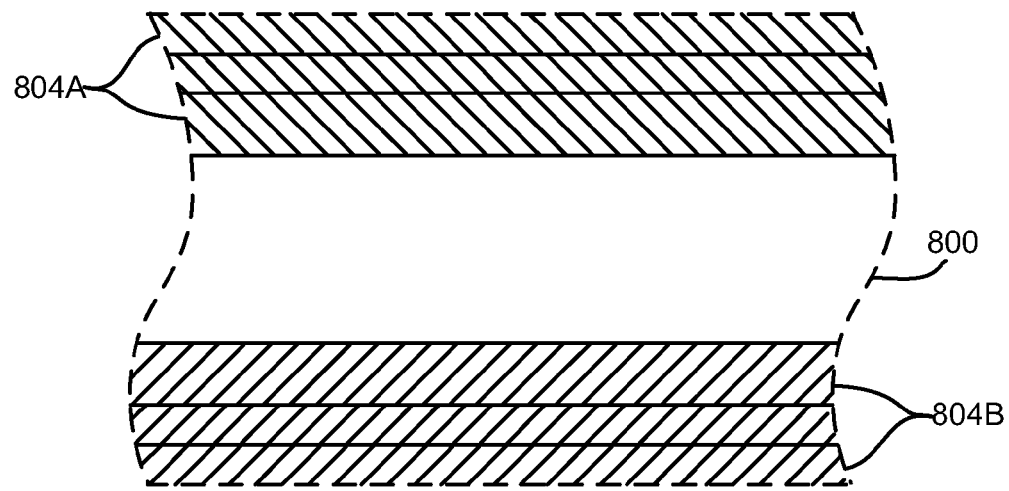
FIG. 10A is a representational diagram of a tape with shingled tracks written in a serpentine fashion according to one embodiment.
Figure 10B:
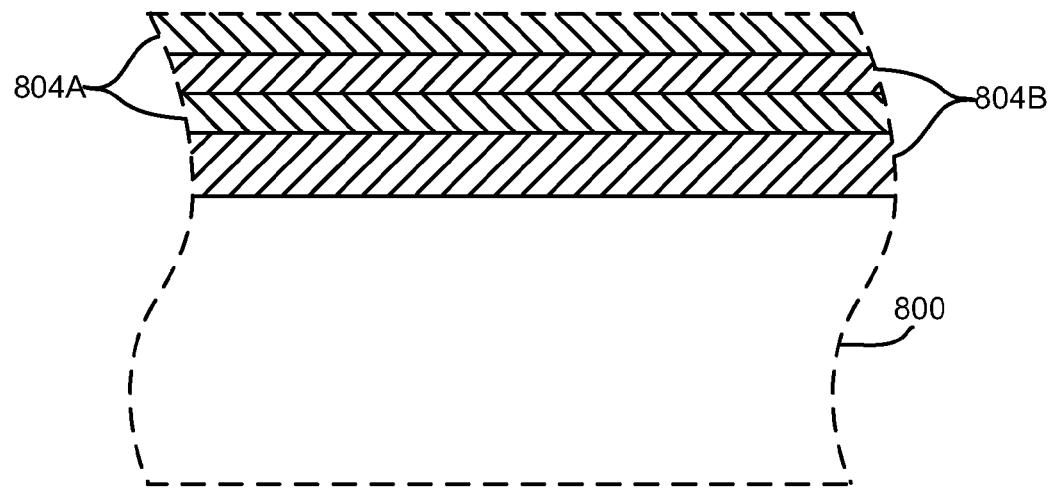
FIG. 10B is a representational diagram of a tape with shingled tracks written in a non-serpentine fashion according to one embodiment.

According to various approaches, the apparatus 900 may be configured for non-serpentine and/or serpentine writing. Additional arrays may be present to enable bidirectional writing, read while write capability, etc. The data tracks 804 of FIG. 8 are depicted as being written in a serpentine manner. FIG. 10A depicts shingled data tracks written in a serpentine manner, with tracks 804A written in a first direction and tracks 804B written in the opposite direction in an alternating fashion, from the outside in, as the tape is moved back and forth in sequential wraps. FIG. 10B depicts shingled data tracks written in a non-serpentine manner.

Figure 11:
FIG. 11 is a partial representational view of a data band of a magnetic recording tape having a contiguous spare area, according to one embodiment.

FIG. 11 depicts a partial view of another embodiment of a product 1100 in the form of a magnetic recording tape, in accordance with one embodiment. As an option, the present product 1100 may be implemented in conjunction with features from any other embodiment listed herein, such as those described with reference to the other FIGS. For example, the product 1100 may be embodied as a cartridge, such as that shown in FIG. 1A, and having a cartridge memory with data therein specifying the format. Of course, however, such product 1100 and others presented herein may be used in various applications and/or in permutations which may or may not be specifically described in the illustrative embodiments listed herein. Further, the product 1100 presented herein may be used in any desired environment.

As shown, the data band of the product 1100 includes data tracks 804, servo tracks 802, and a spare area 806 that is offset from a center of the data band, and correspondingly from the center relative to the array of transducers during writing of the data tracks. In this example, the spare area 806 is proximate a servo pattern 802 on the magnetic recording tape.

Figure 12:
FIG. 12 is a partial representational view of a data band of a magnetic recording tape having a contiguous spare area, according to one embodiment.

FIG. 12 depicts a partial view of another embodiment of a product 1200 in the form of a magnetic recording tape, in accordance with one embodiment. As an option, the present product 1200 may be implemented in conjunction with features from any other embodiment listed herein, such as those described with reference to the other FIGS. For example, the product 1200 may be embodied as a cartridge, such as that shown in FIG. 1A, and having a cartridge memory with data therein specifying the format. Of course, however, such product 1200 and others presented herein may be used in various applications and/or in permutations which may or may not be specifically described in the illustrative embodiments listed herein. Further, the product 1200 presented herein may be used in any desired environment.

As shown, the data band of the product 1200 includes data tracks 804, servo tracks 802, and a spare area 806 that is offset from a center of the data band, and correspondingly from the center relative to the array of transducers during writing of the data tracks. In this example, the spare area 806 is between the center and the outer edge of the data band.

Referring to FIGS. 8 and 12, the spare area 806 splits the data band into portions located on opposite sides thereof. The groups of transducers used to write each of the portions, then, can logically be considered subarrays of the transducer array, each subarray being positioned on an opposite side of the spare area (when in use).

The format may thus specify and/or the corresponding apparatus may be configured to, in one mode of operation, write using only one subarray of the transducers positioned on one side of the spare area. This mode may be used to address tape dimensional instability problems, as the width of the data band read and/or written at a given time is less than a width of the entire array.

Figure 13:
FIG. 13 is a partial representational view of a data band of a magnetic recording tape having a non-contiguous spare area, according to one embodiment.

FIG. 13 depicts a partial view of another embodiment of a product 1300 in the form of a magnetic recording tape, in accordance with one embodiment. As an option, the present product 1300 may be implemented in conjunction with features from any other embodiment listed herein, such as those described with reference to the other FIGS. For example, the product 1300 may be embodied as a cartridge, such as that shown in FIG. 1A, and having a cartridge memory with data therein specifying the format. Of course, however, such product 1300 and others presented herein may be used in various applications and/or in permutations which may or may not be specifically described in the illustrative embodiments listed herein. Further, the product 1300 presented herein may be used in any desired environment.

As shown, the data band of the product 1300 includes data tracks 804, servo tracks 802, and spare areas 806 that are noncontiguous. The spare areas may be positioned in sub-data bands located between the center and outer sub-data bands. The apparatus for writing such product may include a multiplexer (e.g., in the controller of FIG. 1A) for allowing the apparatus to write and/or read in a legacy format that specifies noncontiguous spare areas.

Figure 14:
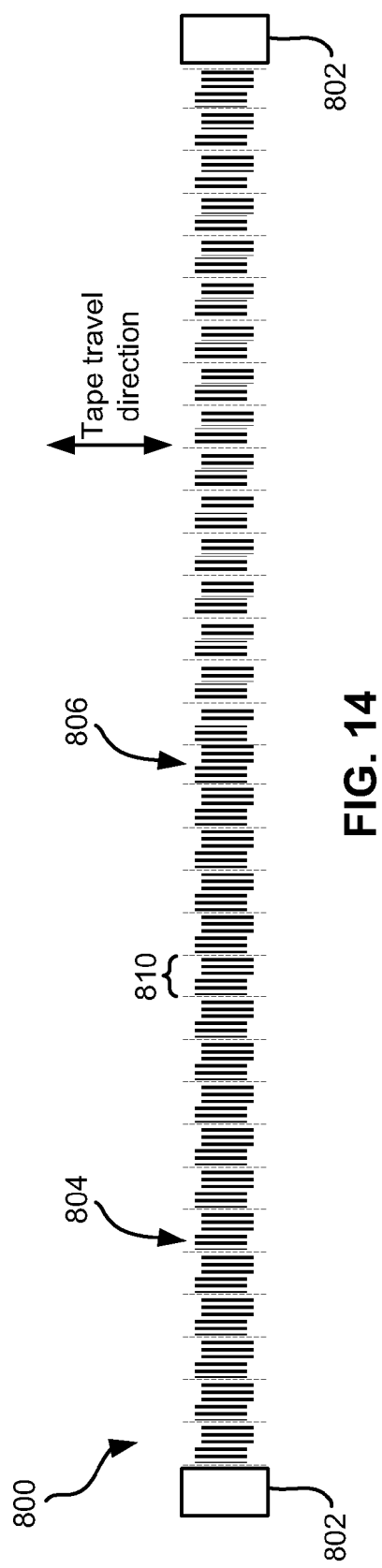
FIG. 14 is a partial representational view of the data band of FIG. 8 having information written in the contiguous spare area, according to one embodiment.

The format may further specify parameters for reading and/or writing in the spare area, as shown in FIG. 14, which depicts the product 800 of FIG. 8 with information written in the spare area 806. For example, information may be coded into the spare area, e.g., at the factory. Such information may include date/location of manufacture, production information, including lot, position on jumbo, temperature, humidity, servo writer head deification, tension, etc. In other approaches, information may include auxiliary information such as servo write head dimensions, metadata, etc. The data may be written in an open format, such as is used to store the linear tape file system (LTFS) partition data. Further, because in the preferred embodiment the spare area is located in the center of the data band, the information therein may provide a reference location. Thus, for example, the track containing the data could be very narrow, e.g. 1 um wide (wide enough to read back) and thus serve as reference feature.

Any apparatuses compliant with the format may include at least one transducer for reading and/or writing in the spare area. For example the apparatus 900 of FIG. 9 may have 33 channels in the above embodiments.

Figure 15:
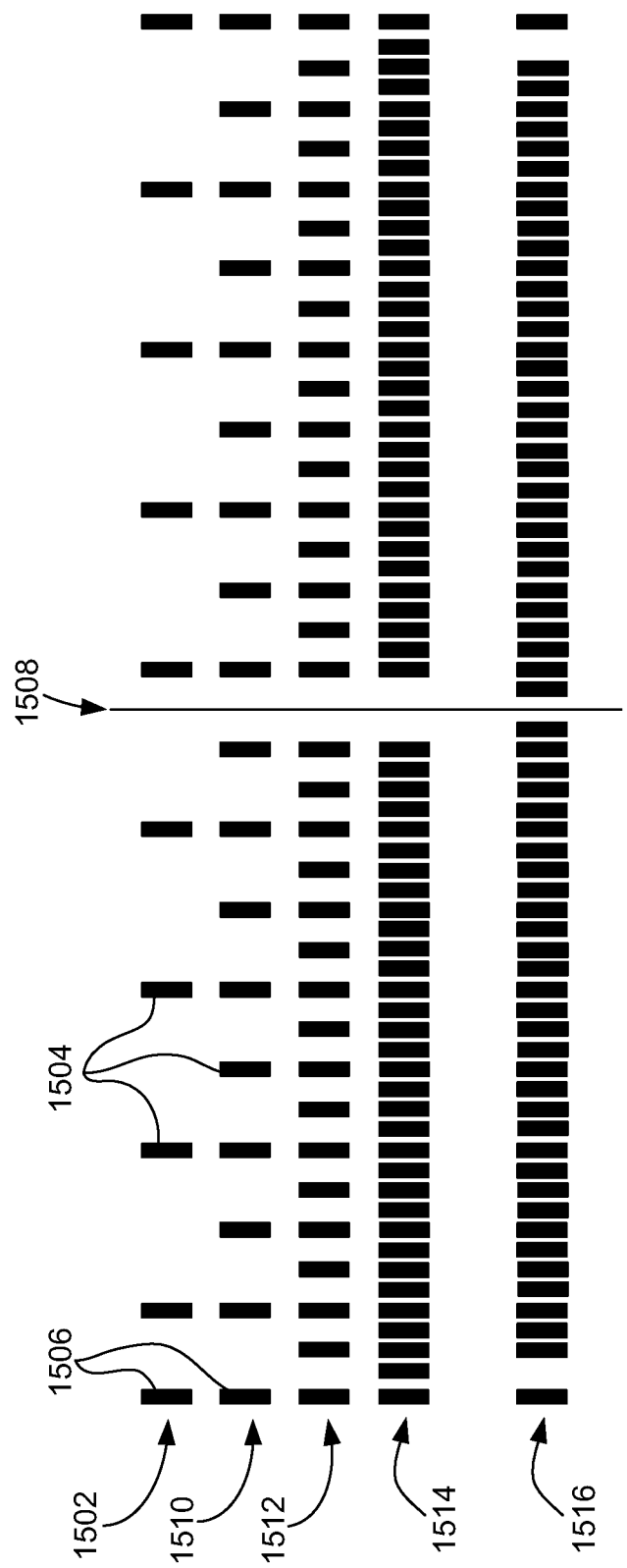
FIG. 15 is a representational view of transducer layouts having varying numbers of active channels and both symmetrical and asymmetrical sub-arrays, according to various embodiments.

FIG. 15 is a representational view of transducer layouts having varying numbers of active channels, and both symmetrical and asymmetrical sub-arrays, according to various embodiments. As an option, any of the present layouts may be implemented in conjunction with features from any other embodiment listed herein, such as those described with reference to the other FIGS. Of course, however, such layouts and others presented herein may be used in various applications and/or in permutations which may or may not be specifically described in the illustrative embodiments listed herein. Further, the layouts presented herein may be used in any desired environment.

Several arrays are shown. Each array includes data transducers 1504 and servo transducers 1506. The transducers are logically divisible into two sub-arrays sandwiching a centerline 1508 of the respective array.

As shown, the arrays include an eight channel array 1502. The eight channel array 1502 is asymmetrical about the centerline 1508.

A 16 channel array 1510 is backward compatible with the eight channel array 1502. The 16 channel array 1510 is symmetrical about the centerline 1508.

A 32 channel array 1512 is backward compatible with the 16 channel array 1510 and the eight channel array 1502. The 32 channel array 1512 is symmetrical about the centerline 1508. An inactive area is located near the centerline 1508. Thus, this array 1514 is configured to provide a spare area along the centerline 1508.

A 64 channel array 1514 is backward compatible with the 32 channel array 1512, the 16 channel array 1510 and the eight channel array 1502. The 64 channel array 1512 is symmetrical about the centerline 1508. This array 1514 is configured to provide a spare area along the centerline 1508.

An alternate 64 channel array 1516 is backward compatible with the 32 channel array 1512, the 16 channel array 1510 and the eight channel array 1502. This array 1514 is configured to provide a spare area along the centerline 1508, as well as spare areas between the servo transducers 1506 and the data transducers 1504 closest thereto. Unlike the asymmetrical array 1502, the array in this embodiment is symmetrical and thus does not require multiplexing during operation, as would be required for asymmetrical arrays.

An apparatus according to one embodiment includes a magnetic head having an array of transducers including data and servo transducers, where the apparatus is configured to read and/or write to a magnetic recording tape according to a format. The format specifies a number of active channels symmetrically arranged about a center of the array which correspond to the transducer locations being symmetrical about the centerline 1508 of the array, locations of data tracks on the magnetic recording tape, and spare areas on the magnetic recording tape. The format also specifies backward compatibility with a second format. The second format specifies a smaller number of active channels than the number of active channels specified by the format.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
 a magnetic head having an array of transducers,
 wherein the apparatus is configured to read and/or write to a magnetic recording tape according to a format,
 wherein the format specifies a number of active channels, locations of data tracks on the magnetic recording tape, and a contiguous spare area on the magnetic recording tape;
 wherein the format also specifies backward compatibility with a second format;
 wherein the second format specifies a smaller number of active channels than the number of active channels specified by the format.

2. An apparatus as recited in claim 1, wherein the spare area is centered relative to the array of transducers.

3. An apparatus as recited in claim 2, wherein the array of transducers has an inactive region positioned between symmetrical subarrays of transducers.

4. An apparatus as recited in claim 1, wherein the spare area is offset from a center relative to the array of transducers.

5. An apparatus as recited in claim 1, wherein the spare area is proximate a servo pattern on the magnetic recording tape.

6. An apparatus as recited in claim 1, wherein the apparatus is further configured, in one mode of operation, to write using only one subarray of the transducers positioned on one side of the spare area.

7. An apparatus as recited in claim 1, wherein the format is modulo an even number, and further comprising at least one transducer for reading and/or writing in the spare area.

8. An apparatus as recited in claim 1, wherein a layout of the transducers in the array is symmetrical about a center point of the array.

9. An apparatus as recited in claim 1, wherein a width of the spare area in a cross track direction is about equal to a center-to-center pitch of adjacent ones of the transducers.

10. An apparatus as recited in claim 1, wherein the second format specifies a contiguous spare area.

11. An apparatus as recited in claim 1, further comprising:
 a drive mechanism for passing a magnetic recording tape over the magnetic head; and
 a controller electrically coupled to the magnetic head.

12. An apparatus, comprising:
 a magnetic head having an array of transducers including data and servo transducers,
 wherein the apparatus is configured to read and/or write to a magnetic recording tape according to a format,
 wherein the format specifies a number of active channels symmetrically arranged about a center of the array, locations of data tracks on the magnetic recording tape, and spare areas on the magnetic recording tape;
 wherein the format also specifies backward compatibility with a second format;

wherein the second format specifies a smaller number of active channels than the number of active channels specified by the format.

13. A product, comprising:
a magnetic recording tape; and
a cartridge memory,
wherein the cartridge memory has data stored therein specifying a format,
wherein the format specifies a number of active channels, locations of data tracks on the magnetic recording tape, and a contiguous spare area on the magnetic recording tape;
wherein the format also specifies backward compatibility with a second format;
wherein the second format specifies a smaller number of active channels than the number of active channels specified by the format.

14. A product as recited in claim 13, wherein the spare area is centered relative to a data band having the spare area.

15. A product as recited in claim 13, wherein the spare area is offset from a center of a data band having the spare area.

16. A product as recited in claim 13, wherein the format further specifies, in one mode of operation, writing using only one sub-array of the channels positioned on one side of the spare area.

17. A product as recited in claim 13, wherein the number of active channels specified by the format is modulo an even number, and the format further specifies parameters for reading and/or writing in the spare area.

18. A product as recited in claim 13, wherein a width of the spare area in a cross track direction is about equal to a width of a sub-data band.

19. A product as recited in claim 13, wherein information is coded into the spare area.

20. A product as recited in claim 13, wherein the second format specifies a contiguous spare area.

* * * * *